United States Patent
Brown et al.

(10) Patent No.: US 6,834,296 B2
(45) Date of Patent: Dec. 21, 2004

(54) APPARATUS AND METHOD OF MULTICASTING OR BROADCASTING DATA FROM ONE PARTITION OF A PARTITIONED COMPUTER SYSTEM TO A PLURALITY OF OTHER PARTITIONS

(75) Inventors: Deanna Lynn Quigg Brown, Pflugerville, TX (US); Vinit Jain, Austin, TX (US); Jeffrey Paul Messing, Austin, TX (US); Satya Prakesh Sharma, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 10/087,919

(22) Filed: Mar. 1, 2002

(65) Prior Publication Data

US 2003/0167313 A1 Sep. 4, 2003

(51) Int. Cl.$^7$ ................................................ G06F 12/08
(52) U.S. Cl. ........................ 709/215; 711/129; 711/173
(58) Field of Search ................................. 711/141, 147, 711/170, 173, 153, 155, 129; 709/313, 215, 213, 104

(56) References Cited

U.S. PATENT DOCUMENTS

| | | | |
|---|---|---|---|
| 6,314,501 B1 | 11/2001 | Gulick et al. | 711/153 |
| 2002/0144010 A1 * | 10/2002 | Younis et al. | 709/314 |
| 2003/0149844 A1 * | 8/2003 | Duncan et al. | 711/141 |
| 2003/0212873 A1 * | 11/2003 | Lee et al. | 711/170 |

* cited by examiner

Primary Examiner—Pierre Bataille
(74) Attorney, Agent, or Firm—Volel Emile; Mark E. McBurney

(57) ABSTRACT

A method, system and apparatus for multicasting or broadcasting a piece of data from one partition of a partitioned computer system to a plurality of partitions of the system are provided. When a partition needs to transfer data to more than one partition of the system, the partition first stores the data into a global memory accessible by all partitions of the system. The memory is then marked "read-only" to ensure that the data is not over-written and the Ids (identifications) of the recipient partitions are passed to a piece of firmware or hardware of the computer system. This firmware or hardware then alerts the recipient partitions that there is a piece of data ready to be read in the memory. Once all the recipient partitions have read the data, the global memory is reverted to a "read" and "write" memory.

8 Claims, 8 Drawing Sheets

| GROUP ID'S | ID'S IN GROUPS |
|---|---|
| $GROUP_1$ | $LPAR_1$ & $LPAR_2$ |
| $GROUP_2$ | $LPAR_1$ & $LPAR_3$ |
| $GROUP_3$ | $LPAR_1$ & $LPAR_4$ |
| $GROUP_4$ | $LPAR_1$, $LPAR_2$ & $LPAR_3$ |
| $GROUP_5$ | $LPAR_1$, $LPAR_3$ & $LPAR_4$ |
| ⋮ | ⋮ |

| PARTITIONS | ID'S |
|---|---|
| PARTITION$_1$ | LPAR$_1$ |
| PARTITION$_2$ | LPAR$_2$ |
| PARTITION$_3$ | LPAR$_3$ |
| PARTITION$_4$ | LPAR$_4$ |
| ⋮ | ⋮ |

FIG. 6

| GROUP ID'S | ID'S IN GROUPS |
|---|---|
| $GROUP_1$ | $LPAR_1$ & $LPAR_2$ |
| $GROUP_2$ | $LPAR_1$ & $LPAR_3$ |
| $GROUP_3$ | $LPAR_1$ & $LPAR_4$ |
| $GROUP_4$ | $LPAR_1$, $LPAR_2$ & $LPAR_3$ |
| $GROUP_5$ | $LPAR_1$, $LPAR_3$ & $LPAR_4$ |
| ⋮ | ⋮ |

FIG. 7

APPARATUS AND METHOD OF MULTICASTING OR BROADCASTING DATA FROM ONE PARTITION OF A PARTITIONED COMPUTER SYSTEM TO A PLURALITY OF OTHER PARTITIONS

BACKGROUND OF THE INVENTION

1. Technical Field

The present invention is directed to a method and apparatus for managing a computer system. More specifically, the present invention is directed to a method and apparatus for multicasting or broadcasting data from one partition of a partitioned computer system to a plurality of partitions.

2. Description of Related Art

Presently, many computer manufacturers design computer systems with partitioning capability. To partition a computer system is to divide the computer system's resources (i.e., memory devices, processors etc.) into groups; thus, allowing for a plurality of operating systems to be concurrently executing on the computer system.

Partitioning a computer system may be done for a variety of reasons. Firstly, it may be done for consolidation purposes. Clearly consolidating a variety of computer systems into one by running multiple application programs that previously resided on the different computer systems on only one reduces (i) cost of ownership of the system, (ii) system management requirements and (iii) footprint size.

Secondly, partitioning may be done to provide production environment and test environment consistency. This, in turn, may inspire more confidence that an application program that has been tested successfully will perform as expected.

Thirdly, partitioning a computer system may provide increased hardware utilization. For example, when an application program does not scale well across large numbers of processors, running multiple instances of the program on separate smaller partitions may provide better throughput.

Fourthly, partitioning a system may provide application program isolation. When application programs are running on different partitions, they are guaranteed not to interfere with each other. Thus, in the event of a failure in one partition, the other partitions will not be affected. Furthermore, none of the application programs may consume an excessive amount of hardware resources. Consequently, no application programs will be starved out of required hardware resources.

Lastly, partitioning provides increased flexibility of resource allocation. A workload that has resource requirements that vary over a period of time may be managed more easily if it is being run on a partition. That is, the partition may be easily altered to meet the varying demands of the workload.

Currently, if a partition of a partitioned system needs to pass data to a plurality of other partitions of the system, it has to use the network. Specifically, the data has to travel down the TCP/IP stack of the transmitting partition and enter the network. From the network, the data enters the recipient partitions through a network interface. The data then has to travel the TCP/IP stack of each recipient partition to be processed. This is a time consuming and CPU intensive task.

Thus, what is needed is an apparatus and method of passing data from one partition of a partitioned system to a plurality of other partitions of the system without using a network.

SUMMARY OF THE INVENTION

The present invention provides a method, system and apparatus for multicasting or broadcasting a piece of data from one partition of a partitioned computer system to a plurality of partitions of the system. When a partition needs to transfer data to more than one partition of the system, the partition first stores the data into a global memory accessible by all partitions of the system. The memory is then marked "read-only" to ensure that the data is not over-written by the other partitions. The Ids (identifications) of the recipient partitions are passed to a piece of firmware or hardware of the computer system. This piece of firmware or hardware then alerts the recipient partitions that there is a piece of data ready to be read in the memory. Once all the recipient partitions have read the data, the global memory is reverted to a "read" and "write" memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a mapping table of partitions and their identifications (Ids).

FIG. 7 depicts a mapping table of group Ids and the Ids they contain.

DETAILED DESCRIPTION OF THE PREFERRED EMBODIMENT

Figure 1:
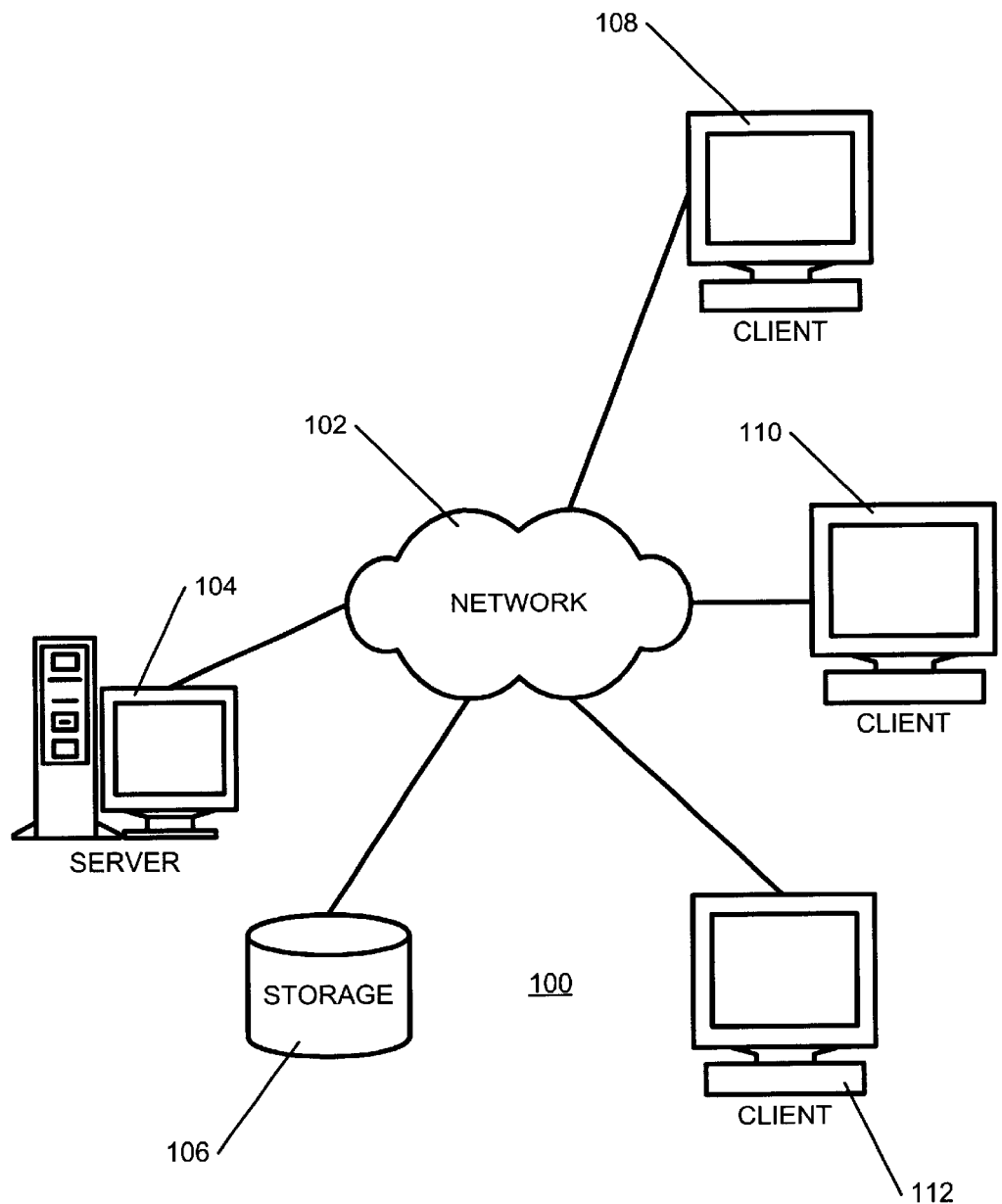
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
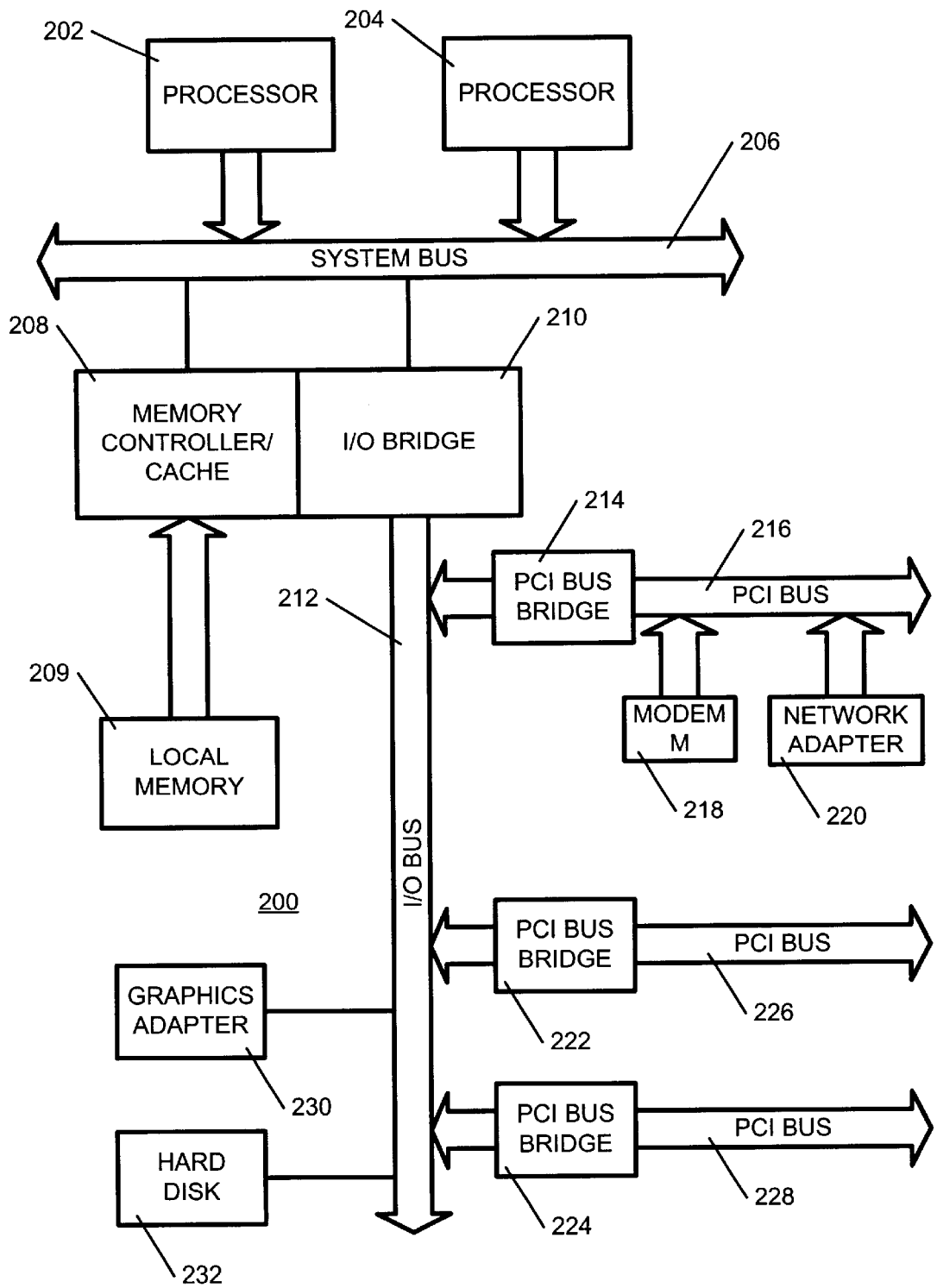
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
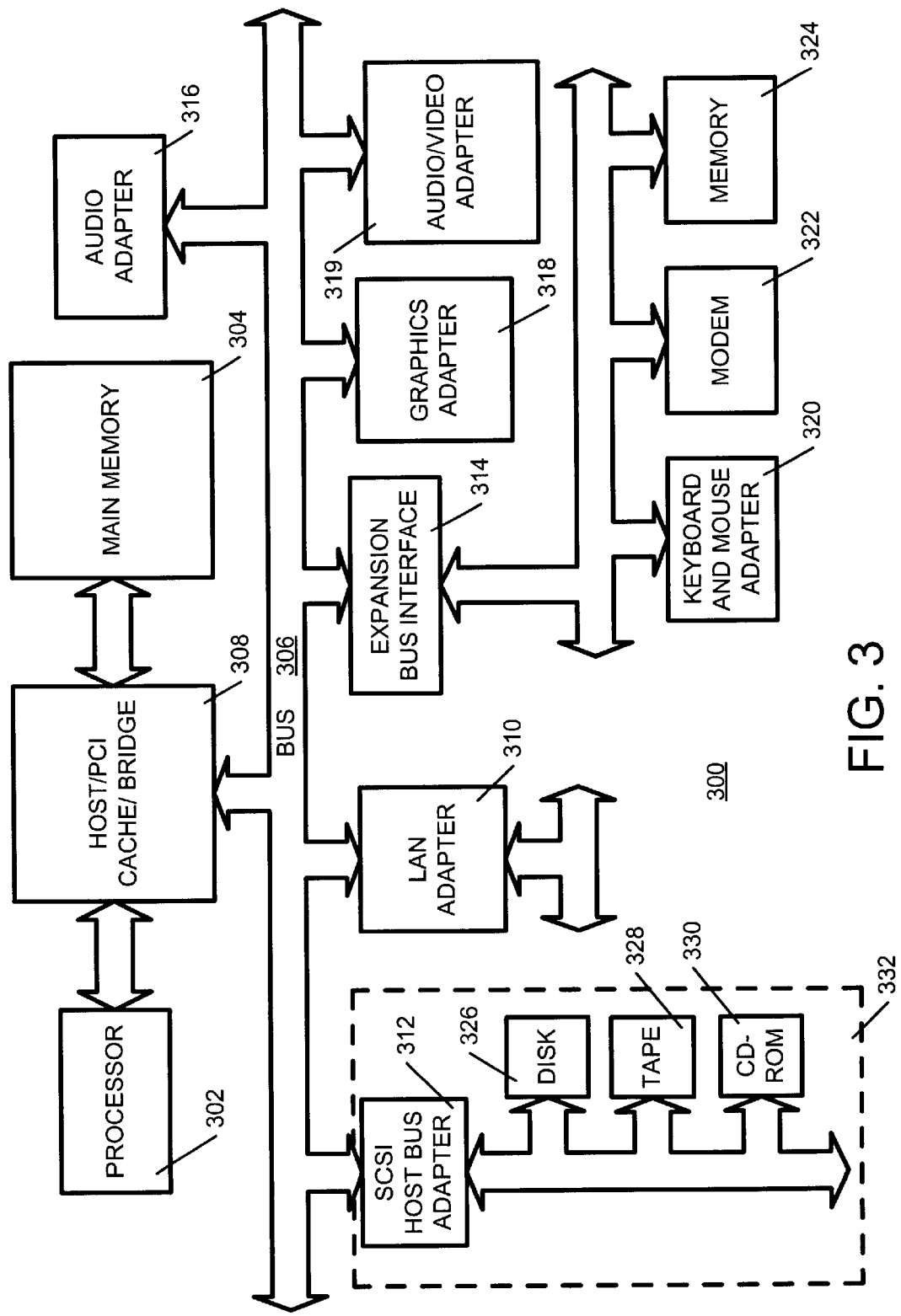
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of passing data from one partition of a partitioned system to a plurality of other partitions of the system without using a network. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

Figure 4:
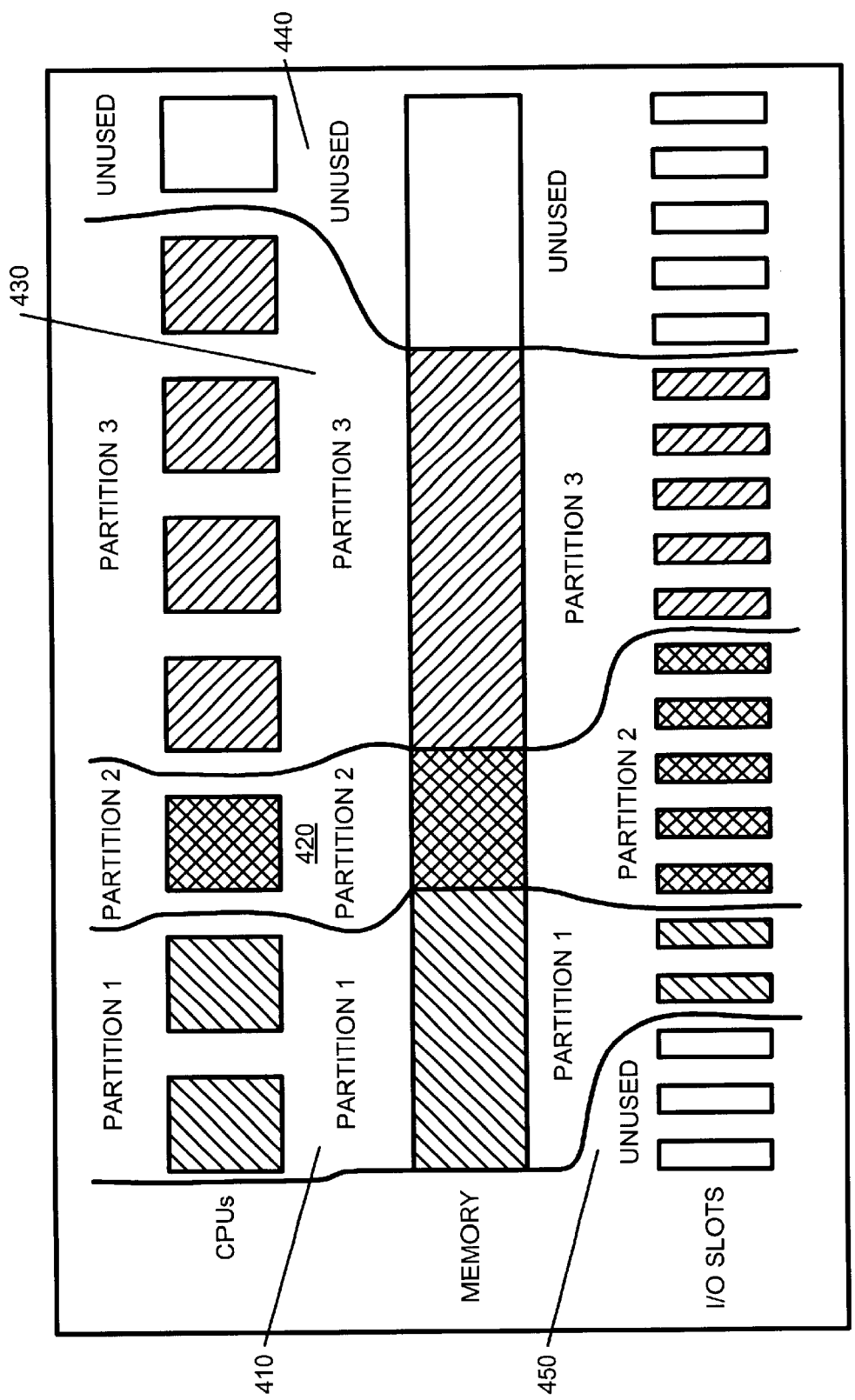
FIG. 4 illustrates logical a plurality of partitions of a computer system.

FIG. 4 illustrates a plurality of partitions of a computer system. Partition 1 410 has two (2) processors, two (2) I/O slots and used a percentage of the memory device. Partition 2 420 uses one (1) processor, five (5) I/O slots and also used a smaller percentage of the memory device. Partition 3 430 uses four (4) processors, five (5) I/O slots and uses a larger percentage of the memory device. Areas 440 and 450 of the computer system are not assigned to a partition and are unused. Note that in FIG. 4 only subsets of resources needed to support an operating system are shown.

As shown, when a computer system is partitioned its resources are divided among the partitions. The resources that are not assigned to a partition are not used. More specifically, a resource may either belong to a single partition or not belong to any partition at all. If the resource belongs to a partition, it is known to and is only accessible to that partition. If the resource does not belong to any partition, it is neither known to nor is accessible to any partition. Note that one CPU may be shared by two or more partitions. In that case, the CPU will spend an equal amount of time processing data from the different partitions.

Figure 5:
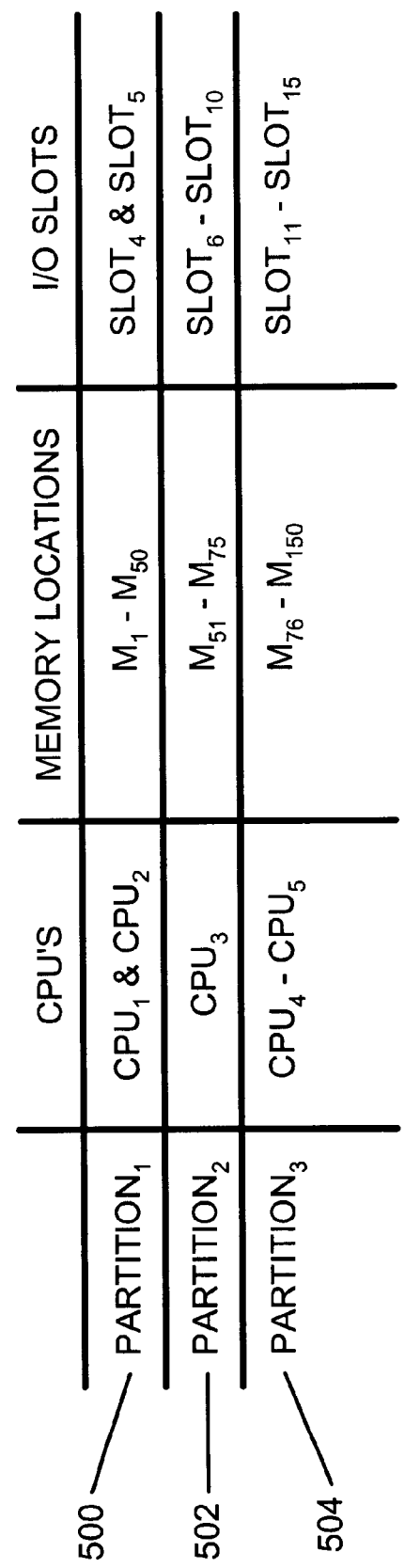
FIG. 5 illustrates a mapping table into which resources belonging to each partition are registered.

The computer system ensures that the resources assigned to one partition are not used by another partition through a mapping table. FIG. 5 illustrates such table. In FIG. 5, $CPU_1$ and $CPU_2$, memory location 1 to memory location 50 (i.e., $M_1$–$M_{50}$) and input/output (I/O) $slot_4$ and $slot_5$ are mapped to $partition_1$ 500. Likewise, $CPU_3$, $M_{51}$–$M_{75}$ and I/O $slot_6$ to $slot_{10}$ are mapped to $partition_2$ 502 and $CPU_4$ to $CPU_7$, $M_{76}$–$M_{150}$ and I/O $slot_{11}$ to I/O $slot_{15}$ are mapped to $partition_3$ 504.

As mentioned before, when a partition of a partitioned system needs to pass a piece of data to a plurality of other partitions of the system, it does so using the network (i.e., the data travels through the TCP/IP stack of the transmitting partition and onto the network, from there it enters each of the receiving partitions, travels through their TCP/IP stack before being able to be processed). This requires quite a bit of processing time and power.

The invention uses a global memory accessible to all the partitions of the system to store the data. Specifically, the transmitting partition first stores the data into the global memory and then passes the identifications (Ids) of the recipient partitions to the firmware or hardware of the partitioned system. Upon receiving the Ids, the firmware or hardware notifies the recipient partitions that they need to read the stored data.

FIG. 6 is a table Of Ids that may be used to reference the partitions. For example, the Id of $partition_1$ is $LPAR_1$, $partition_2$ $LPAR_2$ etc. If $partition_1$ wants to pass a piece of data to $partition_2$, it may use $partition_2$ ID $LPAR_2$.

In certain instances, one partition may want to multicast or broadcast a piece of data to a plurality of partitions. To do so, the partition may use a group Id. FIG. 7 illustrates groups of Ids and the Ids each group contains. For instance, $group_1$ may contain $LPAR_1$ and $LPAR_2$, $group_2$ may contain $LPAR_1$ and $LPAR_3$ etc. Any combination of Ids may be entered into the table. In any event, if the computer system has four partitions, and $partition_4$ wants to broadcast a piece of data to all the other partitions, $partition_4$ may pass group ID $group_4$ to the firmware or hardware. If on the other hand, $partition_4$ wants to multicast a piece of data to $partition_1$ and $partition_3$, it may pass group Id $group_2$ to the hardware and firmware.

Figure 8:
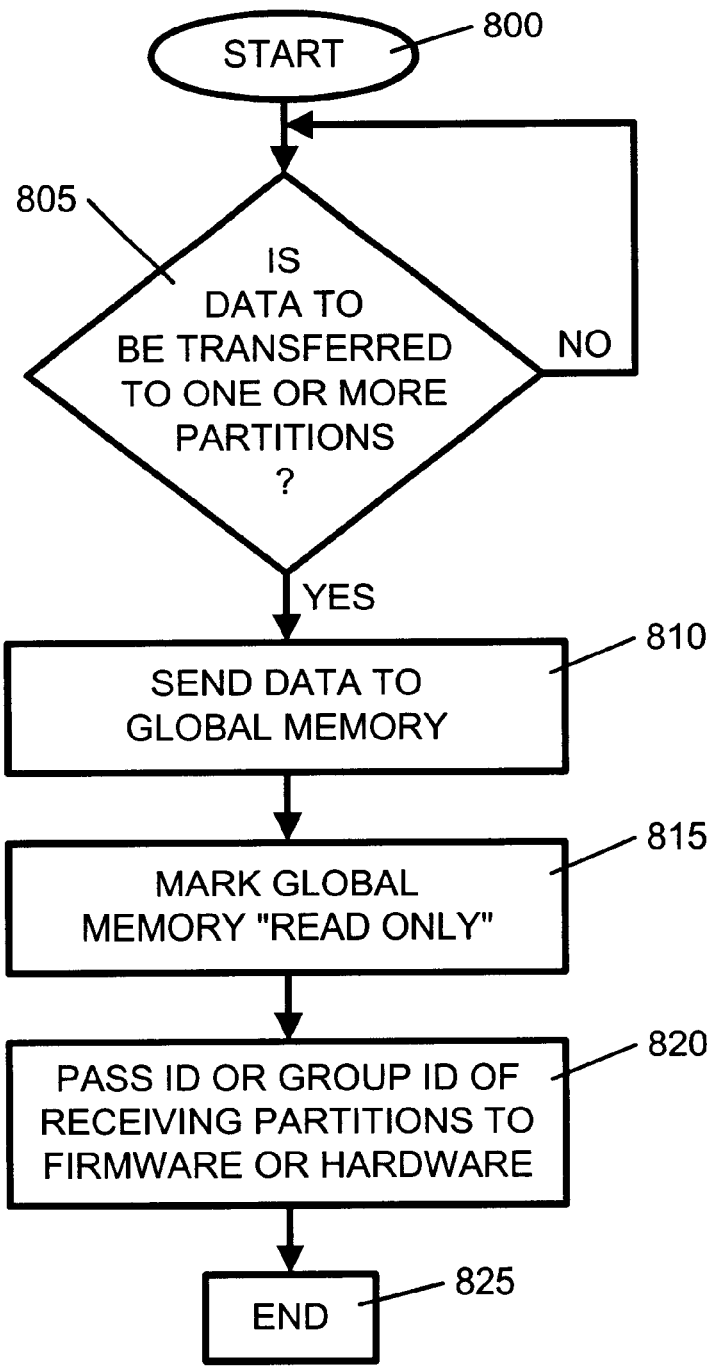
FIG. 8 is a flow chart of a process that may be used with the invention.

FIG. 8 is a flow chart of a process that may be used when a partition needs to transfer data to a plurality of partitions. The process starts when a piece of data is to be transferred (steps 800 and 805). Then, the data is transferred to a global memory accessible by all partitions. The global memory is made to be a "read-only" memory. The global memory may have a method to track the partitions that have read the data. This will ensure that the data is not over-written by another partition that wants to transfer another piece of data to other partitions. Once all the receiving partitions have read the data, the global memory may be switched to a "read" and "write" memory allowing other partitions to write into it.

In any case, after marking the global memory as a "read-only" memory, the Id or group Id is passed to the firmware or hardware of the computer system. If the data is to be passed to a single partition, the firmware or hardware may simply alert the receiving partition there is data to be read in the global memory. If a group Id was used, the firmware or hardware needs only consult the group Id table to determine which partitions are the receiving partitions. Once done, the firmware or hardware then notifies the partitions that there is data in the global memory to be read and the process ends (steps 810–825).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for transferring data from one partition of a partitioned computer system to one or more partitions of the system comprising:

means for determining whether the data is to be transferred to one or more partitions of the system;

means for storing the data, if it is to be transferred to the one or more partitions, into memory locations accessible by all partitions of the system;

means for making the memory locations "read-only";

means for alerting the one or more partitions that there is data to be read; and means for determining, by tracking which partition has read the data, whether all recipient partitions have read the data before allowing another partition to write into the memory locations where the data has been stored.

2. The apparatus of claim 1 wherein a piece of firmware or hardware of the computer system coordinates the transfer of data to the one or more partitions.

3. A computer system containing code data for transferring data from one partition of a partitioned computer system to one or more partitions of the system comprising:

at least one memory device to store the code data; and at least one processor for processing the code data to determine whether the data is to be transferred to one or more partitions of the system, to store the data, if it is to be transferred to the one or more partitions, into memory locations accessible by all partitions of the system, to make the memory locations "read-only", to alert the one or more partitions that there is data to be read, and to determine, by tracking which partition has read the data, whether all recipient partitions have read the data before allowing another partition to write into the memory locations where the data has been stored.

4. The computer system of claim 3 wherein a piece of firmware or hardware of the computer system coordinates the transfer of data to the one or more partitions.

5. A method of transferring data from one partition of a partitioned computer system to one or more partitions of the system comprising the steps of:

determining whether the data is to be transferred to one or more partitions of the system;

storing the data, if it is to be transferred to the one or more partitions, into memory locations accessible by all partitions of the system;

making the memory locations "read-only";

alerting the one or more partitions that there is data to be read; and determining, by tracking which partition has read the data, whether all recipient partitions have read the data before allowing another partition to write into the memory locations where the data has been stored.

6. The method of claim 1 wherein a piece of firmware or hardware of the computer system coordinates the transfer of data to the one or more partitions.

7. A computer program product on a computer readable medium for transferring data from one partition of a partitioned computer system to one or more partitions of the system comprising:

code means for determining whether the data is to be transferred to one or more partitions of the system;

code means for storing the data, if it is to be transferred to the one or more partitions, into memory locations accessible by all partitions of the system;

code means for making the memory locations "read-only";

code means for alerting the one or more partitions that there is data to be read; and code means for determining, by tracking which partition has read the data, whether all recipient partitions have read the data before allowing another partition to write into the memory locations where the data has been stored.

8. The computer program product of claim 7 wherein a piece of firmware or hardware of the computer system coordinates the transfer of data to the one or more partitions.

* * * * *